(12) United States Patent
Gable

(10) Patent No.: US 6,240,259 B1
(45) Date of Patent: May 29, 2001

(54) LOW COST, REUSABLE CAMERA SYSTEM SUITABLE FOR USE WITH CAPTIONED FILM

(75) Inventor: Derek Gable, Rancho Palos Verde, CA (US)

(73) Assignee: Foto Technology, LLC., Henderson, NV (US)

( * ) Notice: Subject to any disclaimer, the term of this patent is extended or adjusted under 35 U.S.C. 154(b) by 0 days.

(21) Appl. No.: 09/401,426

(22) Filed: Sep. 22, 1999

(51) Int. Cl.[7] ............ G03B 17/24; G03B 17/26; G03B 41/00
(52) U.S. Cl. ............ 396/322; 396/310; 396/340; 396/512; 396/538
(58) Field of Search .................. 396/6, 310, 315, 396/316, 317, 318, 322, 512, 513, 538, 535, 335, 340, 311

(56) References Cited

U.S. PATENT DOCUMENTS

| | | |
|---|---|---|
| 684,221 | 10/1901 | Gill . |
| 3,426,666 | 2/1969 | Nagata . |
| 3,490,350 | 1/1970 | Hardies et al. . |
| 3,528,356 | 9/1970 | Eagle . |
| 3,543,664 | 12/1970 | Kremp et al. . |
| 3,581,641 | 6/1971 | Nerwin . |
| 3,592,404 | 7/1971 | Nerwin . |
| 3,613,541 | 10/1971 | Beach . |
| 3,684,206 | 8/1972 | Edwards . |
| 3,728,949 | 4/1973 | Edwards . |
| 4,324,476 | 4/1982 | Seely . |
| 4,469,423 | 9/1984 | Bresson . |
| 4,746,945 | 5/1988 | Chan . |
| 4,884,087 | 11/1989 | Mochida et al. . |
| 4,954,857 | 9/1990 | Mochida et al. . |
| 4,961,085 | 10/1990 | Cho et al. . |
| 4,972,649 | 11/1990 | Mochida . |
| 5,187,512 | 2/1993 | Kirkendall . |
| 5,212,511 | 5/1993 | Burnham et al. . |
| 5,235,364 | 8/1993 | Ohmura . |
| 5,305,039 | 4/1994 | Dassero . |
| 5,452,036 | 9/1995 | Kamata . |
| 5,530,507 | 6/1996 | Boyd . |
| 5,565,936 | * 10/1996 | Kim et al. .............. 396/340 |
| 5,765,061 | * 6/1998 | Mintzberg et al. ........... 396/316 |
| 5,835,795 | * 11/1998 | Craig et al. ............... 396/6 |
| 5,895,132 | 4/1999 | Asakura et al. . |
| 5,915,140 | 6/1999 | Owashi . |

FOREIGN PATENT DOCUMENTS

| | | |
|---|---|---|
| 3035571 | 2/1982 | (DE) . |
| 000102024 | 3/1984 | (EP) . |
| 363273845 | 11/1988 | (JP) . |
| 02275442A | 11/1990 | (JP) . |
| 040362620 | 12/1992 | (JP) . |

\* cited by examiner

*Primary Examiner*—Alan A. Mathews
(74) *Attorney, Agent, or Firm*—Lyon & Lyon LLP

(57) ABSTRACT

A camera case and film cartridge system that can be used with captioned film (i.e., film that has a pre-exposed caption such as "Happy Birthday" or "It's a Boy" on each film frame such that when the remainder of the film frame is exposed with the camera in the normal course, the each resulting picture will include the caption) in which the film cartridge is designed and constructed to use the standard 35mm film cannister (or any other standard film cannister) so that the film, once exposed in the normal course, can be developed at any retail or commercial developing facility that is equipped to handle the standard film cannister. The film cartridge includes a diffuser that partially shields the pre-exposed, captioned portion of the film from further exposure. Because the diffuser is incorporated into the film cartridge instead of the camera case, the same camera can be used with different captioned formats.

6 Claims, 3 Drawing Sheets

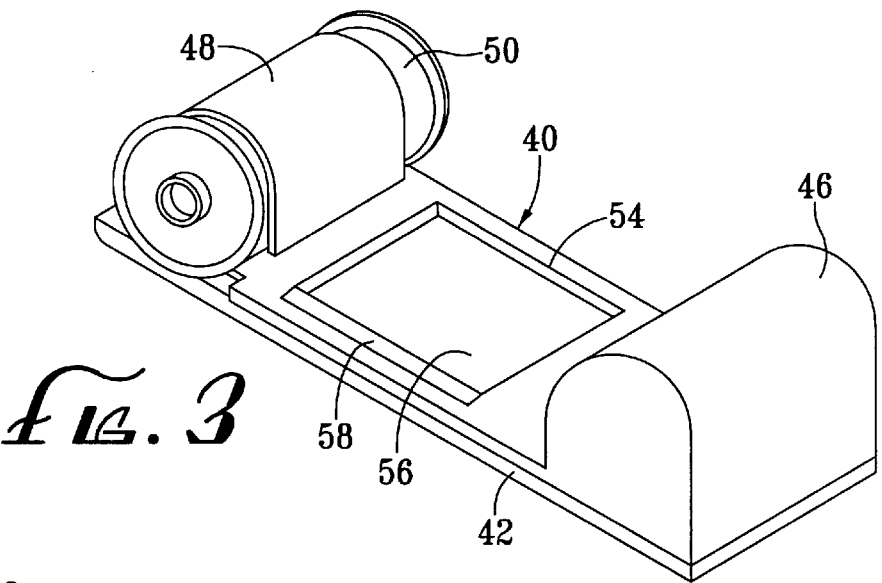
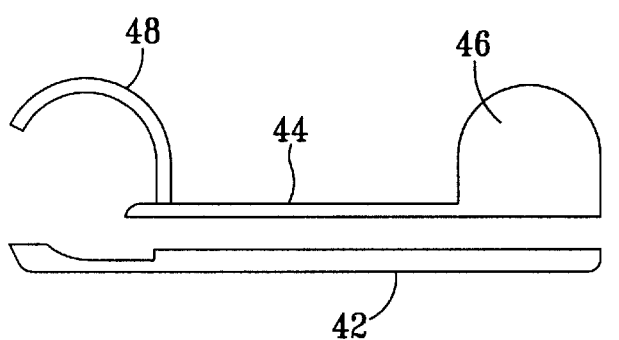
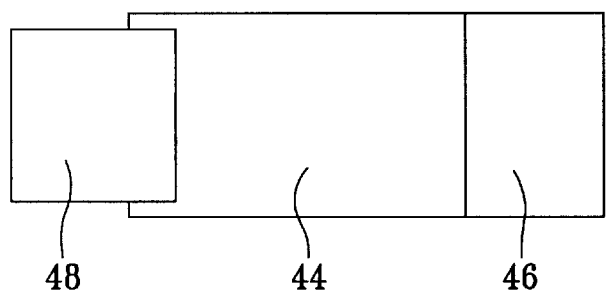

LOW COST, REUSABLE CAMERA SYSTEM SUITABLE FOR USE WITH CAPTIONED FILM

FIELD OF INVENTION

This invention relates generally to the field of cameras; and more specifically, relates to the design of a low-cost, reusable camera that accommodates film having a pre-exposed (or "captioned") portion, and film that does not.

BACKGROUND OF THE INVENTION

The desire of mankind to record the moment, to preserve the event for future viewing, enjoyment or posterity, is timeless. Cave paintings represent the earliest recorded efforts of prehistoric man to preserve their significant daily events. Since then, easier ways have developed.

The modern photographic art dates back well over 100 years. Indeed, the very first cameras, consisting of the large box on a tripod, the extendable lens, the shroud under which the photographer disappeared before taking the picture, and the flash plate which held the exploding chemicals, can still be seen in period movies and TV shows.

Since then, the photographic art has proceeded apace at both ends of the spectrum, as high-end digital cameras which use a computer disk instead of film are now widely available, and, low-end, single use cameras, which are essentially light-tight boxes having a lens, film, and film spooling mechanism, are ubiquitous in any tourist destination. Many of the advancements in the art have been directed to different ways of dealing with the film (or, in the very early days, plates).

Equally ubiquitous are patents directed to the photographic arts. For example, U.S. Pat. No. 684,221 issued on Oct. 8, 1901 for a two-piece "Combined Plate and Film Camera" in which film rolls or plates were housed in one piece, and the lens and shutter housed in the other piece. The two pieces could be removably fitted together to take pictures, then another film/plate piece fitted with the lens/shutter piece to continue taking pictures.

Not surprisingly, the Polaroid Corporation and the Eastman Kodak Company are each assignees for countless patents relating to developments in the camera and film art. (See, for example, U.S. Pat. Nos. 3,613,541, 3,728,949, 4,324,476, 4,469,423, 5,187,512, and 5,212,511). In each of these camera designs, the film (either in a cannister or cartridge) is loaded in the camera for exposure, then removed for development.

The one constant in every camera design, beginning with the shroud affixed to the earliest camera, is that unintended exposure of the film must be avoided. Therefore, the film must be protected from various forms of radiation at all times other than when the desired, intended exposure occurs. Thus, the camera, the film cannister, and the film cartridge must be light-tight.

As mentioned above, one aspect of development at the low-end has been the single use 35 mm camera. These are essentially throw-away devices. The user purchases the camera with one roll of film (typically 12, 24 or 36 exposures) already loaded. Once the photographer has used up all frames on the film roll (or less, if the user so desires), the entire camera is presented to the film developer who dismantles the camera in a dark room, removes the exposed film, and develops it. The component parts of the camera are then typically recycled in one fashion or another. Various aspects of this single-use camera have also been patented. (See, for example, U.S. Pat. Nos. 5,530,507, 5,235,364, 4,972,649, 4,961,085, 4, 954,857, and 4,884,087)

While this development in the camera art has been proceeding apace, a corresponding development has taken place in the film development industry. Not too long ago, almost all exposed film was taken by the non-professional photographer to his or her local camera shop or drug store, who would in turn send the film out for development by large commercial developers who could accommodate just about every type of film, film cannister or film cartridge then available. This meant, however, that the film developer had to have expensive darkroom facilities in which the exposed film could be removed from whatever cannister or cartridge in which it was encased for processing, all without ruining the film by inadvertent exposure to radiation. It typically took several days for the photographer to receive his or her photographs.

However, more recently, 35 mm film has become the most used type of film due to the quality of the pictures and enlargements it produces. Additionally, the 35 mm cannister has also become the standard. Perhaps in response to or because of this standardization of film, store-front film developing businesses promising 1-hour turnaround times have now become commonplace. The developing equipment used in these establishments is generally geared to the modern day roll of 35 mm film, housed in a drop-in cannister. This generally cylindrical, light-tight cannister is sold with the film (typically either 24 or 36 exposures) pre-loaded, with one end (the "leader") of the film protruding from a side slit. The cannister is also fitted with a central post or spool to which the other end of the film is attached, and around which the film is rolled initially. The central spool is also typically notched at one or both ends so as to engage the winding mechanism in the camera. In a typical 35 mm camera, this film cannister is dropped into an appropriately-sized and geared cavity on the interior of the camera, the film leader is either manually or mechanically attached to the take-up mechanism in the camera which advances the film to the next frame after each picture is taken. Once all frames have been used, the film is either manually or mechanically re-wound back into the cannister, and the cannister is then removed and submitted for development.

Therefore, the vast majority of new cameras are designed to accommodate the standard 35 mm film cannister.

Another modern development in cameras and film is "captioned" film wherein each frame of the film contains a caption, such as "It's a Boy" or some other phrase or artwork, on one or more edges of the film frame. The remainder of the film frame is used for the actual picture taken by the camera, such that when ultimately developed, each picture will have the caption as an integral component of the composite photograph. There are a number of issued patents relating to captioned film in general (see, for example, U.S. Pat. Nos. 5,835,795, 5,615,396, 5,613,165, 5,565,936, 5,546,146, 5,187,512, and 4,827,291).

In 5,187,512, means for pre-exposing the caption on the film frames, and means for shielding the pre-exposed portion of the film when the remainder of the film frame is exposed to light through the camera lens when the picture is taken, are disclosed in either a single-use camera or a camera adapted for use with a film cartridge. In '512, the shielding means is a completely opaque piece that is attached either to the camera itself, or to the preformed film cartridge, so as to prevent light which enters through the camera's lens from reaching the preexposed caption on the film frame. Neither the single-use camera nor the preformed film cartridge in '512, however, can be developed by equipment that is restricted to the standard 35 mm film cannister.

In 5,565,936, an attempt is made to overcome this drawback in '512 by using a peelable masking strip or tape to cover the caption portion on the film. In that way, the captioned film can be loaded into the conventional 35 mm cannister and pictures taken in any standard 35 mm camera. When the film is removed from the cannister for developing, the masking tape is removed, and the film developed in the conventional way. However, the masking tape adds another component cost and step to both the assembly of the film canister and the development.

Both of the systems disclosed in '512 and '936 also suffer from what some users may consider a drawback—that the line of demarcation between the caption and the picture is well defined. In other words, there is no blending of the caption with the picture. This concern was addressed in the '795 and '987 patents, which employed a translucent diffuser as the "shielding means," rather than the opaque shielding means used in the '512 patent. This translucent diffuser allowed some light to pass through when the remainder of the film frame was exposed, so as to substantially eliminate the line of demarcation between caption and picture and thereby produce a relatively smoothly blended composite picture. Because the selected diffuser is attached to the camera, however, the camera was not well-adapted for use with non-captioned film, and, even with respect to captioned film, could only be used with film having a caption that aligned with the placement of the particular diffuser pre-installed in the camera (for example, only along the bottom edge of the picture frame). It would be preferable that the camera be able to accommodate different caption arrangements, or even non-captioned film.

Therefore, there is a need in the art for a camera and film system that overcomes these drawbacks in the prior art.

SUMMARY OF INVENTION

A novel camera and film cartridge system is disclosed which incorporates, in one embodiment, the standard 35 mm film cannister in a film cartridge that can include any desired shape diffuser as the shielding means for the previously exposed captioned film.

By incorporating the standard 35 mm cannister into the cartridge, the photographer can have the film developed at any one of the store front, 1-hour development shops that are found in abundance in just about every tourist destination. Because tourists are always anxious to review their pictures as soon as possible, and because they often are not staying in one locale long enough to wait days to have the film sent to a commercial developer and then returned, the advantage this invention provides to them is significant.

Also, the novel system disclosed and claimed herein is not a single-use camera. Rather, the same camera can be used with different captioned film cartridges, or with film cartridges having no captions at all. Therefore, a vacationing family will not have to purchase a new, single-use, captioned-film camera at each vacation destination, but only a new captioned-film cartridge. Similarly, most vacationers do not necessarily want the same caption on every photograph, and may want pictures without any caption. With the prior art camera systems, however, the photographer would need at least two cameras—one for each of the captioned pictures, and one for non-captioned shots. Moreover, if a vacationing family intended to visit three or four different venues within a short period of time, and wanted to take captioned pictures specific to each venue, and also to take non-captioned pictures during the same time, that family would need to purchase and carry with them at least five different cameras.

With the camera system of this invention, however, the same camera can accommodate both captioned film having different captions, and non-captioned film. Because the diffuser or template is incorporated into the film cartridge, a non-captioned film cartridge without any diffuser or template can be used to produce full frame, non-captioned photographs. Moreover, because the film cartridge of this invention includes a light-tight compartment at both ends, the photographer could switch from one cartridge to another (for example, switching from one caption to another, or to a non-captioned film), without exposing any portion of the film other than the single frame in the exposure frame of the cartridge. By insuring that the film is advanced before changing the cartridge, the photographer can easily switch cartridges without double-exposing any pictures already taken. Therefore, rather than having to purchase and carry four or five different cameras, the vacationing family would only need the single camera of this invention, plus whatever captioned or non-captioned film cartridges they desired.

DESCRIPTION OF THE FIGURES

FIG. 3 is a perspective view of the film cartridge showing the film cannister which is incorporated into one end, the light-tight housing at the other end, and the center section which can alternatively include the appropriately sized and shaped diffuser if the loaded film is pre-exposed with the caption, the template if the caption is to be applied simultaneously with the picture, or simply a full exposure frame if non-captioned film is used.

FIG. 4 is a top, exploded view of the cartridge, without the incorporated film cannister.

FIG. 5 is a side view of the cartridge, also without the film cannister.

DETAILED DESCRIPTION OF THE PREFERRED EMBODIMENT

Figure 1:
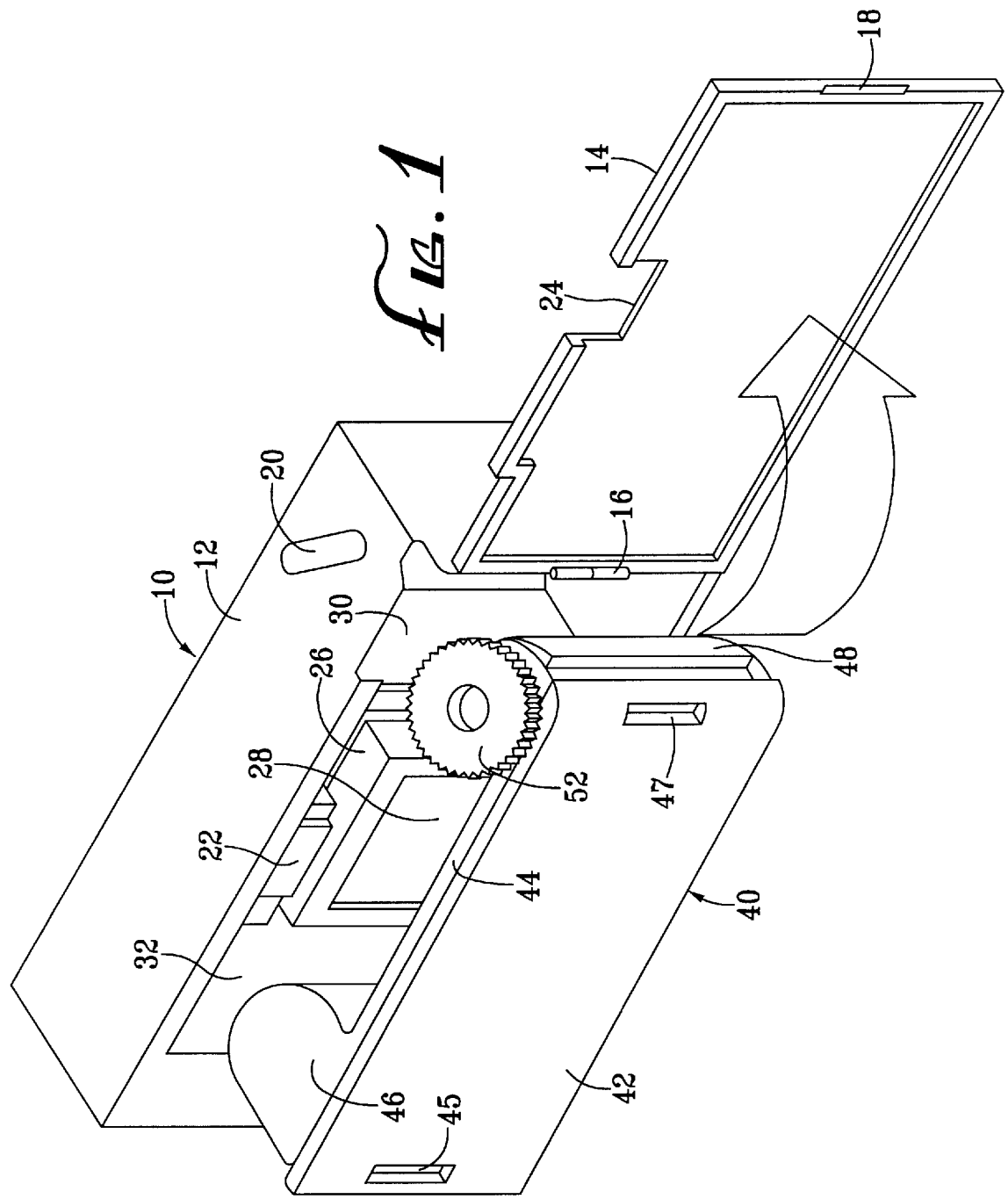
FIG. 1 is a perspective view of the camera system, showing the basic camera with film cartridge adapted for loading into the back of the camera.

Turning to FIG. 1, a simple back-loading camera 10 is disclosed having a body 12 and a door 14, which is attached to the body 10 via hinge 16 in the conventional way. The door 14 also has attachment means 18 that connect with appropriate attachment means (not shown) on the body 10 so as to securely hold the door 14 in a closed position against body 10.

The remainder of the camera comprises a shutter button 20, which is attached to a conventional, low-cost shutter mechanism (not shown), so as to activate the shutter to allow light to pass through the lens (not shown) when the shutter button is depressed. The camera also has a view-finder 22, which is sized and shaped to extend through an appropriately-shaped notch 24 on the door 14.

The camera 10 also has an interior, light-tight tunnel 26 that defines channel that has, at one end, the shutter and lens (not shown), and defines a square or rectangular exposure frame 28 at its other end. The body 12 of the camera 10 also is formed so as to define cavities 30 and 32, the purpose of which will be disclosed below.

Film cartridge 40 is sized and shaped to fit easily but snugly into the body 12 of camera 10, and to be held there in place when the door 14 is closed.

Film cartridge 40, as best seen in FIGS. 3, 4 and 5, comprises a back plate 42 to which is a front piece 44 is attachable by conventional means. Once attached, the back plate 42 and front piece 44 define a channel that extends the length of back plate 42. That channel is sized to allow the typical 35 mm film to pass there-through easily, but with very little "play" so that the film stays in alignment. One end 46 of the front piece 44 is formed in the shape of a hollow cannister (once back plate 42 and front piece 44 are attached together) which communicates with the channel, and into which the unexposed captioned or non-captioned film is load during assembly of the cartridge. The back plate 42 and front piece 44 are attached together by conventional plastic snap-hook means 45 and 47.

The other end of front piece 44 has a semi-circular snap-holder 48 into which the standard sized 35 mm film cannister 50 can be affixed and held in place. AS discussed above, this is the standard 35 mm film cannister which has a central spool (not shown) to which one end of the film is attached. In assembling the cartridge 40, the film is uncoiled out of the cannister 50, and coiled into the film holder 46. The back plate 42 and front piece 44 are brought together so that the film (not shown) his held in, and can travel though, the channel formed between the plate 42 and piece 44. The ratchet 52 is affixed to one of the central spool in the cannister 50, so that as the ratchet 52 is turned, the film is rewound within the cannister 50.

As best seen in FIG. 3, the front piece 44 has a center section 54 that extends from the film holder 46 to the snap holder 48. The center section 54 has an aperture 56 that corresponds to and aligns with the exposure film 28. It does not, however, perfectly align if the film being used is captioned film. In that instance, the captioned part of the film (not shown) will need to be protected from unlimited double exposure. However, some exposure of the caption is desirable so as to create a smoothly blended composite. As shown in FIG. 3, the film cartridge 40 is constructed to house film that has a caption along the lower edge of the film. Thus, center section 54 has an insert 58 that is appropriately sized and shaped to shield the captioned portion of the film. Moreover, whereas the remainder of center section 54 is completely opaque, the insert 58 is translucent.

As will be appreciated, the insert 58 can be omitted altogether and the film cartridge and camera can then be used with non-captioned film to provide full-sized 35 mm pictures. Similarly, the center piece 54 and insert 58 can be sized and shaped to accommodate any type of captioning— from the simple bottom-edge inscription as accommodated by the film cartridge shown in FIG. 3, to a border inscription or decoration that might extend around the entire periphery of the photograph, to anything in between.

Figure 2:
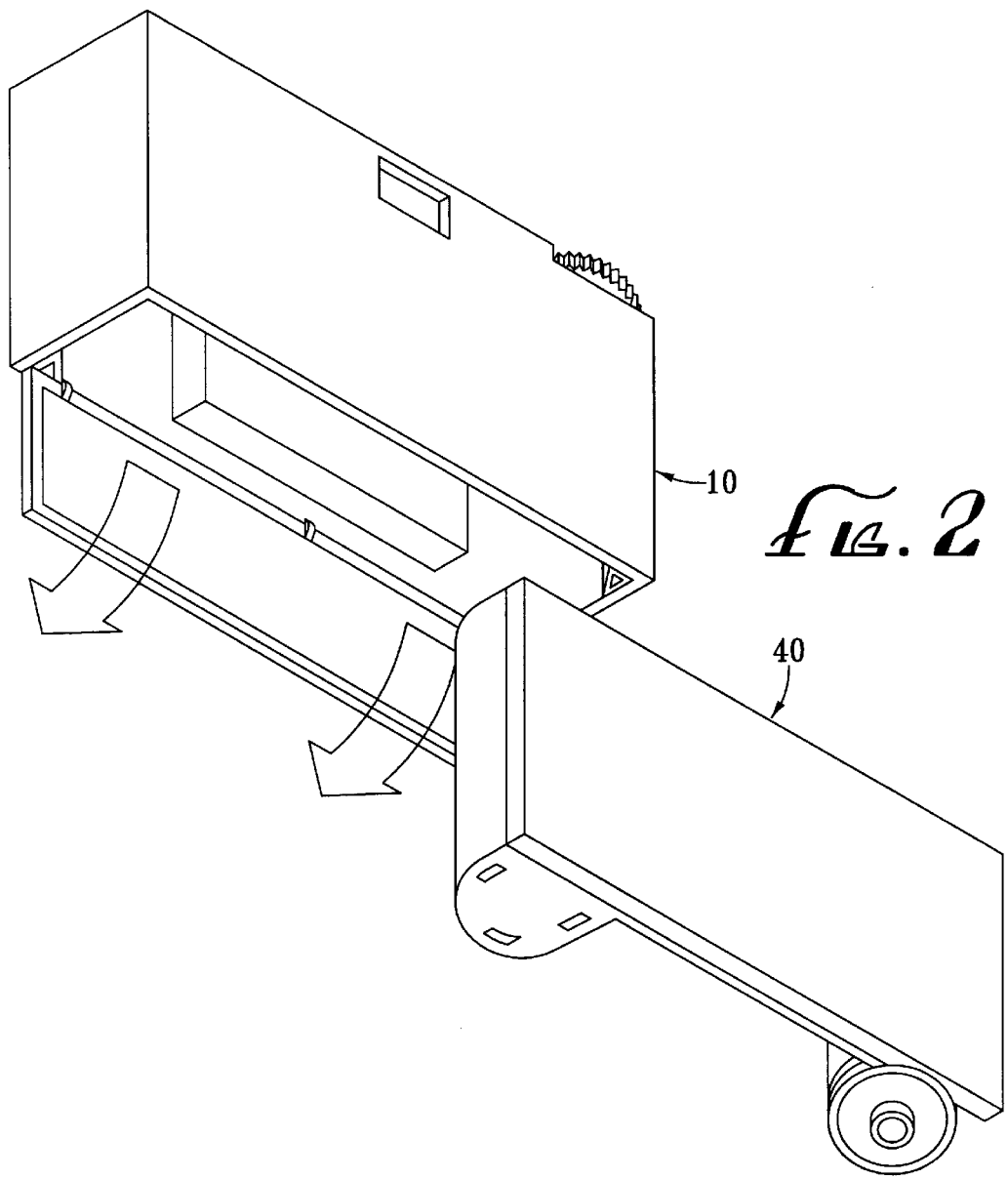
FIG. 2 is a perspective view showing an alternate embodiment in which the film cartridge is loaded into the bottom of the camera.

In FIG. 2, an alternate embodiment of the camera 10 and film cartridge 40 is shown in which the film cartridge is bottom-loaded rather than back loaded. However, the component part of the film cartridge in this embodiment would be the same as those described above. Indeed, it would be apparent to those skilled in the art that the novel aspects of this invention could be incorporated into various different camera body designs. Therefore, the invention claimed is not limited to the specific embodiments shown and described, but is of the full breadth of the following claims, and each of them.

What is claimed is:

1. A low cost, re-usable camera and film cartridge system, capable of use with captioned film, comprising:
  a. a camera case;
  b. said camera case having a lens and shutter mechanism;
  c. an openable door attached to said camera case;
  d. said openable door providing access to a space within said camera case that is designed and constructed to accept a film cartridge therein, said film cartridge comprising:
    i) a first end, a center section and a second end;
    ii) said first end designed and constructed to hold a film cannister to which one end of a film strip is attached to the center spool thereof;
    iii) said center section defining a pathway through which the film from said film cannister can travel;
    iv) said center section also have an aperture appropriately sized and located such that when said film cartridge is loaded into said camera case and said shutter and lens mechanism is activated, light admitted through said lens exposes the film in said center section that is visible though said aperture;
    v) said center section further having a diffuser appropriately placed so as partially to shield that portion of the film frame that contains the caption from further exposure by light admitted through said lens and shutter mechanism;
    vi) said second end comprising a film holder for the film from the film cannister; and
  e) film take-up means for advancing the film after a picture is taken.

2. The invention of claim 1 in which the film cannister is the standard 35 mm film cannister.

3. The invention of claim 1 in which said openable door is located on the bottom of said camera case.

4. The invention of claim 1 in which said openable door is located on the back of said camera case.

5. The invention of claim 1 in which said take-up means are located on said film cartridge.

6. The invention of claim 1 in which said take-up means are located on said camera case.

* * * * *